(12) United States Patent
Kanatsu

(10) Patent No.: US 7,965,892 B2
(45) Date of Patent: Jun. 21, 2011

(54) IMAGE PROCESSING APPARATUS, CONTROL METHOD THEREOF, AND PROGRAM

(75) Inventor: Tomotoshi Kanatsu, Meguro-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 1007 days.

(21) Appl. No.: 11/342,807

(22) Filed: Jan. 31, 2006

(65) Prior Publication Data

US 2006/0171587 A1   Aug. 3, 2006

(30) Foreign Application Priority Data

Feb. 1, 2005  (JP) ................................. 2005-025507
Dec. 15, 2005  (JP) ................................. 2005-362374

(51) Int. Cl.
*G06K 9/34* (2006.01)

(52) U.S. Cl. ........ 382/176; 382/199; 382/167; 382/173; 382/239

(58) Field of Classification Search .................. 382/176, 382/194, 239, 273; 358/1.9, 2.7
See application file for complete search history.

(56) References Cited

U.S. PATENT DOCUMENTS

| | | | | |
|---|---|---|---|---|
| 5,166,810 A * | 11/1992 | Sorimachi et al. | ............ | 358/462 |
| 5,680,478 A | 10/1997 | Wang et al. | .................... | 382/176 |
| 5,696,842 A * | 12/1997 | Shirasawa et al. | ............ | 382/176 |
| 5,748,778 A * | 5/1998 | Onoguchi | .................... | 382/199 |
| 5,872,864 A * | 2/1999 | Imade et al. | .................... | 382/176 |
| 5,920,655 A * | 7/1999 | Makita et al. | .................. | 382/272 |
| 6,020,979 A * | 2/2000 | Zeck et al. | ...................... | 358/1.9 |
| 6,064,494 A * | 5/2000 | Hirota et al. | .................... | 358/1.9 |
| 6,198,841 B1 * | 3/2001 | Toyama et al. | ................ | 382/164 |
| 6,360,006 B1 * | 3/2002 | Wang | ............................. | 382/162 |
| 6,473,202 B1 * | 10/2002 | Kanata et al. | .................. | 358/2.1 |
| 6,775,031 B1 * | 8/2004 | Fujiwara | .......................... | 358/2.1 |
| 6,839,151 B1 * | 1/2005 | Andree et al. | .................. | 358/2.1 |
| 7,024,043 B1 * | 4/2006 | Fujimoto et al. | .............. | 382/237 |
| 7,170,647 B2 | 1/2007 | Kanatsu | ......................... | 358/453 |
| 7,437,017 B2 * | 10/2008 | Aihara | ............................ | 382/289 |
| 7,508,541 B2 * | 3/2009 | Ishiguro | ........................... | 358/1.9 |
| 2002/0081031 A1 * | 6/2002 | Suzuki | ........................... | 382/194 |
| 2002/0085243 A1 * | 7/2002 | Kanatsu | ........................ | 358/453 |
| 2002/0164084 A1 * | 11/2002 | Baggs | ............................. | 382/275 |
| 2003/0063802 A1 * | 4/2003 | Li et al. | .......................... | 382/199 |
| 2004/0061883 A1 | 4/2004 | Kanatsu | ........................... | 358/1.9 |
| 2004/0114187 A1 * | 6/2004 | Furukawa | ..................... | 358/3.08 |
| 2004/0125410 A1 * | 7/2004 | Shirata et al. | .................. | 358/2.1 |
| 2004/0175037 A1 * | 9/2004 | Guleryuz | ....................... | 382/180 |
| 2004/0218836 A1 | 11/2004 | Kanatsu | .......................... | 382/305 |
| 2005/0141037 A1 * | 6/2005 | Shin | .............................. | 358/3.15 |
| 2005/0180645 A1 * | 8/2005 | Hasegawa et al. | ............. | 382/239 |
| 2005/0270582 A1 * | 12/2005 | Hara | .............................. | 358/2.1 |

FOREIGN PATENT DOCUMENTS

| | | | |
|---|---|---|---|
| EP | 0946048 A2 | * | 3/1999 |
| JP | 2002-312794 | * | 10/2002 |
| JP | 2002312794 A | * | 10/2002 |
| JP | 2004-80100 | * | 3/2004 |

* cited by examiner

*Primary Examiner* — Brian Q Le
*Assistant Examiner* — Mekonen Bekele
(74) *Attorney, Agent, or Firm* — Fitzpatrick, Cella, Harper & Scinto

(57) ABSTRACT

A binary image is generated by binarizing a multilevel image. An edge image is generated by extracting an edge component in the multilevel image. The binary image is segmented into a plurality of regions with different attributes. An outline candidate of a halftone region is extracted from the edge image. A second region segmentation result is output on the basis of the information of the outline candidate and information of the region segmentation result.

6 Claims, 22 Drawing Sheets

FIG. 6A
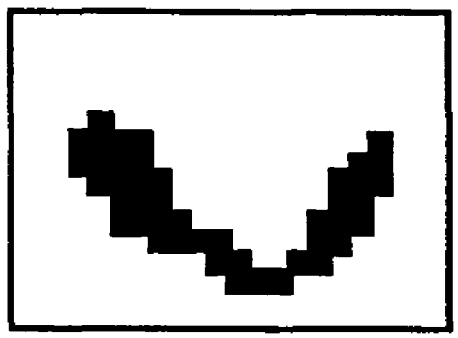
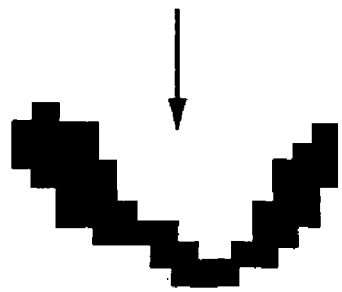
FIG. 6B
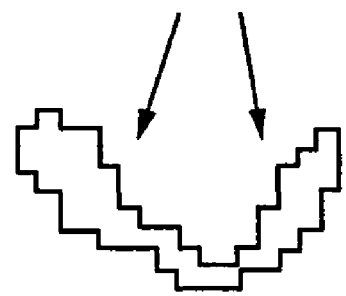

RECTANGULAR BLACK PIXEL BLOCK

NONRECTANGULAR BLACK PIXEL BLOCK

FIG. 14

| -1 | -1 | 0 | 1 | 1 |
|----|----|----|----|----|
| -1 | -1 | 0 | 1 | 1 |
| -1 | -1 | 0 | 1 | 1 |
| -1 | -1 | 0 | 1 | 1 |
| -1 | -1 | 0 | 1 | 1 |

FIG. 17

The Front Line of the Internet

NAS 2004

NAS 2004 WILL BE HELD THIS YEAR IN THE CHIDORICHO CULTURAL CENTER IN OTA WARD, TOKYO. THIS EXHIBITION IS THE BIGGEST EVENT IN JAPAN CONCERNING NEW NETWORK-RELATED HARDWARE/ SOFTWARE PRODUCTS AND SERVICES AND ATTRACTS AN ATTENDANCE OF 100,000 OR MORE EVERY YEAR.

~1701

AAAAAAAAAAAA

IT ZONE
DATA WAREHOUSES, ERP GROUPWARE, GPS OBSERVATION SYSTEMS, AND NETWORK MONITORING TOOLS WILL BE ON DISPLAY IN THE IT ZONE

WEB ZONE
IN THE WEB ZONE, DISPLAY OF ALL SORTS OF WEB APPLICATIONS AND SALES OF NEW SERVICES BY SERVICE PROVIDES WILL BE HELD.

PC ZONE
A HOST OF NOTEBOOK PCS AND SUB-NOTEBOOK PCS USING NEW PROCESSORS, INCLUDING SPACE-SAVER DESKTOP COMPUTERS, WILL BE SHOWN.

ACCESS

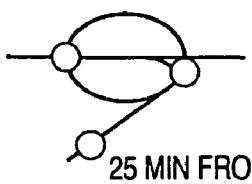

25 MIN FROM TOKYO STATION BY KEIHIN-TOHOKU LINE
33 MIN FROM SHINJUKU STATION VIA SHINAGAWA

NETWORK ZONE
FAX SERVERS AND MOBILE NETWORK SERVERS WITH BROAD APPLICABILITY IN BOTH OFFICE AND HOME AND, MAINLY, NEW PRODUCTS OF ROUTERS AND HUBS FOR WIRELESS LAN WILL BE EXHIBITED IN THE NETWORK ZONE. MANY FIREWALL AND VIRUS GUARD PRODUCTS WILL BE ON DISPLAY, TOO.

322 The Compi-Net Magazine Jan 2003

FIG. 18

The Front Line of the Internet

NAS 2004

NAS 2004 WILL BE HELD THIS YEAR IN THE CHIDORICHO CULTURAL CENTER IN OTA WARD, TOKYO. THIS EXHIBITION IS THE BIGGEST EVENT IN JAPAN CONCERNING NEW NETWORK-RELATED HARDWARE/ SOFTWARE PRODUCTS AND SERVICES AND ATTRACTS AN ATTENDANCE OF 100,000 OR MORE EVERY YEAR.

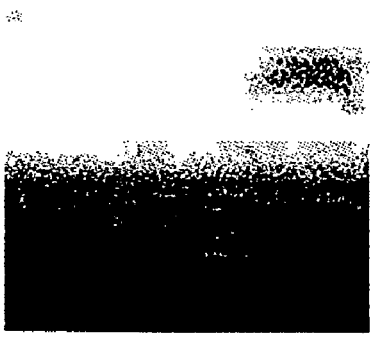

AAAAAAAAAAAA

IT ZONE
DATA WAREHOUSES, ERP GROUPWARE, GPS OBSERVATION SYSTEMS, AND NETWORK MONITORING TOOLS WILL BE ON DISPLAY IN THE IT ZONE

WEB ZONE
IN THE WEB ZONE, DISPLAY OF ALL SORTS OF WEB APPLICATIONS AND SALES OF NEW SERVICES BY SERVICE PROVIDES WILL BE HELD.

PC ZONE
A HOST OF NOTEBOOK PCS AND SUB-NOTEBOOK PCS USING NEW PROCESSORS, INCLUDING SPACE-SAVER DESKTOP COMPUTERS, WILL BE SHOWN.

ACCESS

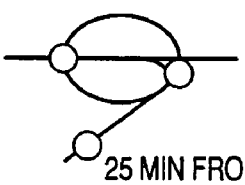

25 MIN FROM TOKYO STATION BY KEIHIN-TOHOKU LINE
33 MIN FROM SHINJUKU STATION VIA SHINAGAWA

NETWORK ZONE
FAX SERVERS AND MOBILE NETWORK SERVERS WITH BROAD APPLICABILITY IN BOTH OFFICE AND HOME AND, MAINLY, NEW PRODUCTS OF ROUTERS AND HUBS FOR WIRELESS LAN WILL BE EXHIBITED IN THE NETWORK ZONE. MANY FIREWALL AND VIRUS GUARD PRODUCTS WILL BE ON DISPLAY, TOO.

322 The Compi-Net Magazine Jan 2003

FIG. 20

The Front Line of the Internet

NAS 2004

NAS 2004 WILL BE HELD THIS YEAR IN THE CHIDORICHO CULTURAL CENTER IN OTA WARD, TOKYO. THIS EXHIBITION IS THE BIGGEST EVENT IN JAPAN CONCERNING NEW NETWORK-RELATED HARDWARE/ SOFTWARE PRODUCTS AND SERVICES AND ATTRACTS AN ATTENDANCE OF 100,000 OR MORE EVERY YEAR.

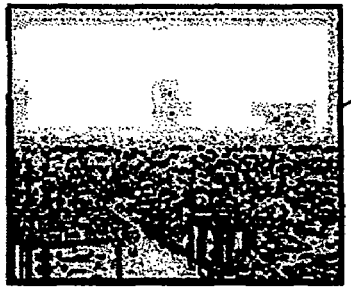

AAAAAAAAAAAA — 2001

IT ZONE
DATA WAREHOUSES, ERP GROUPWARE, GPS OBSERVATION SYSTEMS, AND NETWORK MONITORING TOOLS WILL BE ON DISPLAY IN THE IT ZONE

WEB ZONE
IN THE WEB ZONE, DISPLAY OF ALL SORTS OF WEB APPLICATIONS AND SALES OF NEW SERVICES BY SERVICE PROVIDES WILL BE HELD.

NETWORK ZONE
FAX SERVERS AND MOBILE NETWORK SERVERS WITH BROAD APPLICABILITY IN BOTH OFFICE AND HOME AND, MAINLY, NEW PRODUCTS OF ROUTERS AND HUBS FOR WIRELESS LAN WILL BE EXHIBITED IN THE NETWORK ZONE. MANY FIREWALL AND VIRUS GUARD PRODUCTS WILL BE ON DISPLAY, TOO.

PC ZONE
A HOST OF NOTEBOOK PCS AND SUB-NOTEBOOK PCS USING NEW PROCESSORS, INCLUDING SPACE-SAVER DESKTOP COMPUTERS, WILL BE SHOWN.

ACCESS

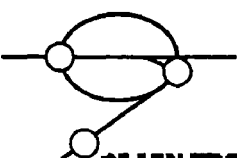

25 MIN FROM TOKYO STATION BY KEIHIN-TOHOKU LINE
33 MIN FROM SHINJUKU STATION VIA SHINAGAWA

322 The Compl-Net Magazine Jan 2003

FIG. 21
2101
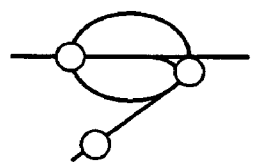

IMAGE PROCESSING APPARATUS, CONTROL METHOD THEREOF, AND PROGRAM

FIELD OF THE INVENTION

The present invention relates to an image processing apparatus for segmenting a multilevel image into a plurality of regions with different attributes, a control method thereof, and a program.

BACKGROUND OF THE INVENTION

Information electronization is progressing recently, and there is growing a demand for saving or transmitting electronic documents in place of paper documents. Especially, along with the development of low-cost storage media and the increase in communication band, documents to be electronized now include not only monochrome binary data but also full-color documents.

Document electronization here goes beyond simply photoelectrically converting a paper document into image data by an image input device such as a scanner. The electronization also includes recognizing the contents of image data and segmenting it into regions with different properties, e.g., texts, symbols, graphics, photos, and tables contained in the paper document. Data conversion to an optimum form is also part of the electronization. For example, a character part is converted into character code information, a graphic is converted into vector data, a photo is converted into image data, and a table is converted into structure data.

As the first step of the document electronization, a region segmentation process is executed. More specifically, the contents of a document image of one page are analyzed, and the image is segmented into partial elements with different properties such as characters, graphics, photos, and tables.

An implementation example of the region segmentation process is U.S. Pat. No. 5,680,478. In U.S. Pat. No. 5,680,478, sets of 8-connected outline blocks of black pixels and 4-connected outline blocks of white pixels in a document image are extracted. Characteristic regions such as characters, pictures, graphics, tables, frames, and lines in the document are extracted on the basis of the shape, size, and set state of each block.

However, the above-described region segmentation process assumes on its operation principle that the input document image is monochrome binary data. To use this technique for region segmentation of a color document, the document image must be binarized in advance. However, region information contained in the color image is lost upon binarization.

Binarization of a color image is done by calculating a luminance threshold value from the pixel luminance distribution and converting each pixel of the image into a white or black pixel in accordance with the luminance threshold value. For example, a method of defining one luminance threshold value for the entire image of a page aims at accurately binarizing a character part. This method cannot therefore reflect, on the binary image, the shape of, e.g., a photo region where the luminance difference at the outline boundary is indeterminable on the basis of the luminance threshold value.

There is also a method of segmenting an image into a tile-like sub-regions and setting different binary threshold values for the respective regions. In this case, a smaller luminance difference can be reflected on binarization. However, no satisfactory binarization result can be obtained always for objects with random positions and shapes in a color image because the process result depends on how to segment the sub-regions.

Consequently, in a halftone image such as a photo or natural picture, the boundary position may be lost upon binarization. In this case, the accurate coordinates of regions are hard to recognize.

In, e.g., Japanese Patent Laid-Open No. 2002-312794, an edge image is acquired by processing a color image by using a differential filter, and the region segmentation process is executed after the edge image and a simple binary image are ORed. However, if a halftone region to be extracted and another region are in close vicinity, the halftone region position may erroneously be extracted because the regions cannot be segmented due to the influence of image reduction which is executed before the region segmentation process to stabilize or speed up the process or the influence of blurring by the filter itself.

There is a need for a region segmentation processing method capable of accurately extracting a halftone region even when a color or gray multilevel document image is input and subjected to a reduction process as a pre-process for speedup.

SUMMARY OF THE INVENTION

The present invention has been made to solve the above-described problems, and has as its object to provide an image processing apparatus which can implement a region segmentation process capable of accurately extracting a halftone region from a multilevel image, a control method thereof, and a program.

According to the present invention, the foregoing object is attained by providing an image processing apparatus for segmenting a multilevel image into a plurality of regions with different attributes, comprising;

input means for inputting a multilevel image;

binary image generation means for generating a binary image by binarizing the multilevel image;

edge image generation means for generating an edge image by extracting an edge component in the multilevel image;

region segmentation means for segmenting the binary image into a plurality of regions with different attributes;

outline extraction means for extracting an outline candidate of a halftone region from the edge image; and output means for outputting a second region segmentation result on the basis of information of the outline candidate obtained by the outline extraction means and region segmentation result information obtained by the region segmentation means.

In a preferred embodiment, the apparatus further comprises remove means for removing, on the edge image, pixels of a part corresponding to a character region in the edge image in accordance with the region segmentation result information obtained by the region segmentation means, wherein the outline extraction means extracts the outline candidate of the halftone region from the edge image after removal by the remove means.

In a preferred embodiment, each of the binary image generation means and the edge image generation means comprises reduction process means for executing a reduction process for each image as a process target.

In a preferred embodiment, the outline extraction means comprises:

extraction means for extracting a black pixel block from the edge image; and determination means for determining the black pixel block as the outline candidate of the halftone region on the basis of a shape of the black pixel block extracted by the extraction means.

In a preferred embodiment, the edge image generation means comprises:

reduction process means for executing a reduction process for the multilevel image to generate a reduced image; and generation means for generating the edge image by calculating an edge strength in each pixel of the reduced image and quantizing each pixel on the basis of the edge strength.

In a preferred embodiment, the outline extraction means extracts the outline candidate of the halftone region from the edge image generated by the quantization.

According to the present invention, the foregoing object is attained by providing a control method of an image processing apparatus for segmenting a multilevel image into a plurality of regions with different attributes, comprising:

an input step of inputting a multilevel image;

a binary image generation step of generating a binary image by binarizing the multilevel image;

an edge image generation step of generating an edge image by extracting an edge component in the multilevel image;

a region segmentation step of segmenting the binary image into a plurality of regions with different attributes:

an outline extraction step of extracting an outline candidate of a halftone region from the edge image: and an output step of outputting a second region segmentation result on the basis of information of the outline candidate obtained in the outline extraction step and region segmentation result information obtained in the region segmentation step.

According to the present invention, the foregoing object is attained by providing a program to implement control of an image processing apparatus for segmenting a multilevel image into a plurality of regions with different attributes, comprising:

a program code for an input step of inputting a multilevel image;

a program code for a binary image generation step of generating a binary image by binarizing the multilevel image;

a program code for an edge image generation step of generating an edge image by extracting an edge component in the multilevel image;

a program code for a region segmentation step of segmenting the binary image into a plurality of regions with different attributes;

a program code for an outline extraction step of extracting an outline candidate of a halftone region from the edge image; and a program code for an output step of outputting a second region segmentation result on the basis of information of the outline candidate obtained in the outline extraction step and region segmentation result information obtained in the region segmentation step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6A is a view showing an example of a black pixel block according to the embodiment of the present invention;

FIG. 6B is a view showing an example of a white pixel block according to the embodiment of the present invention;

FIG. 14 is a view showing an example of a differential filter according to the embodiment of the present invention;

FIG. 17 is a view showing an example of a color image according to the embodiment of the present invention;

FIG. 18 is a view showing an example of a binary image according to the embodiment of the present invention;

FIG. 20 is a view showing an example of an edge image according to the embodiment of the present invention;

FIG. 21 is a view showing an example of an edge image after the character remove process according to the embodiment of the present invention.

DETAILED DESCRIPTION OF THE PREFERRED EMBODIMENT

A preferred embodiment of the present invention will now be described in detail in accordance with the accompanying drawings.

Figure 1:
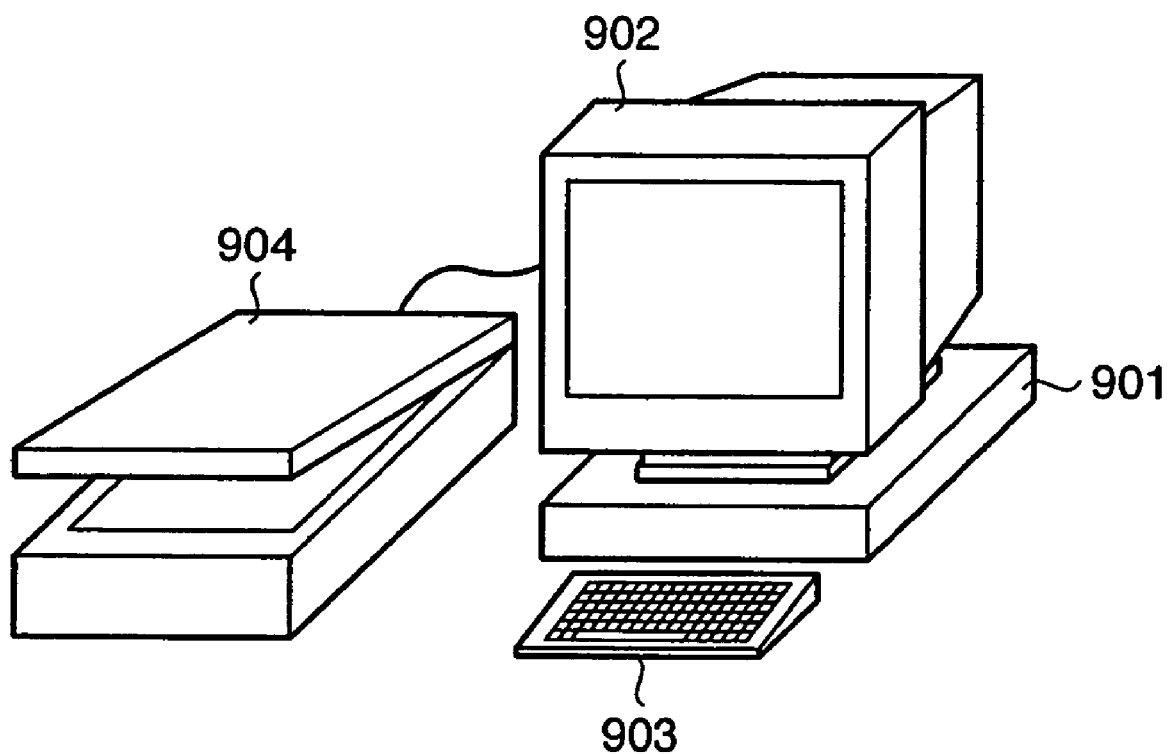
FIG. 1 is a view showing the outer appearance of an image processing apparatus according to an embodiment of the present invention.

FIG. 1 is a view showing the outer appearance of an image processing apparatus according to an embodiment of the present invention.

Referring to FIG. 1, a computer apparatus 901 executes an image processing program capable of implementing the present invention. A display device 902 (e.g., a CRT or LCD) to display, for a user, process situations or image information of, e.g., a document image and an input interface 903 such as a keyboard or mouse to receive the user operation are connected to the computer 901. A color scanner device 904 optically reads a paper document and transmits the resultant electronized image data to the computer apparatus 901.

In addition to the above-described components, the computer apparatus 901 also has standard components (e.g., CPU, memories (RAM and ROM), hard disk, external storage device, and network interface) incorporated in a general-purpose computer.

Especially, various kinds of programs including the image processing program of the present invention are stored in the hard disk and executed under the control of the CPU.

The functional arrangement of the image processing apparatus of this embodiment will be described next with reference to FIG. 2.

Figure 2:
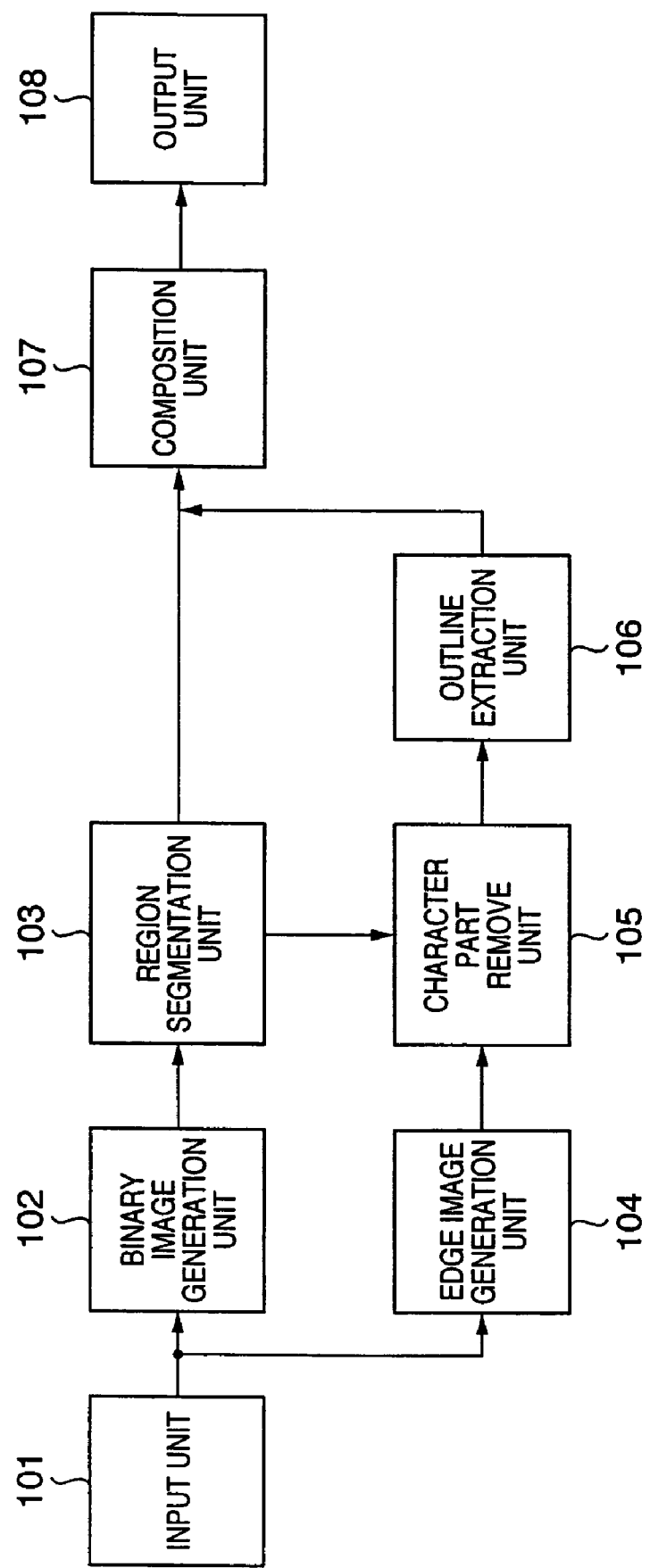
FIG. 2 is a block diagram showing the functional arrangement of the image processing apparatus according to the embodiment of the present invention.

FIG. 2 is a block diagram showing the functional arrangement of the image processing apparatus according to the embodiment of the present invention.

An input unit 101 inputs a read document (e.g., paper document) from the color scanner device 904 as color image data. A binary image generation unit 102 converts the color image data into binary image data. A region segmentation unit 103 segments the binary image data into elements (objects) of a plurality of kinds of attributes such as character, graphic, table, frame, and line.

An edge image generation unit 104 extracts an edge image containing edge components from the differential information of the color image data. A character part remove unit 105 removes, on the edge image, pixels in a character region from region segmentation information obtained by region segmentation. An outline extraction unit 106 extracts outline extraction information (outline data) from the edge image. A composition unit 107 composites the region segmentation information and outline extraction information. An output unit 108 outputs the composition result (region segmentation result) from the composition unit 107 as a file or an image to be displayed.

The binarization process executed by the binary image generation unit 102 will be described next with reference to FIG. 3.

Figure 3:
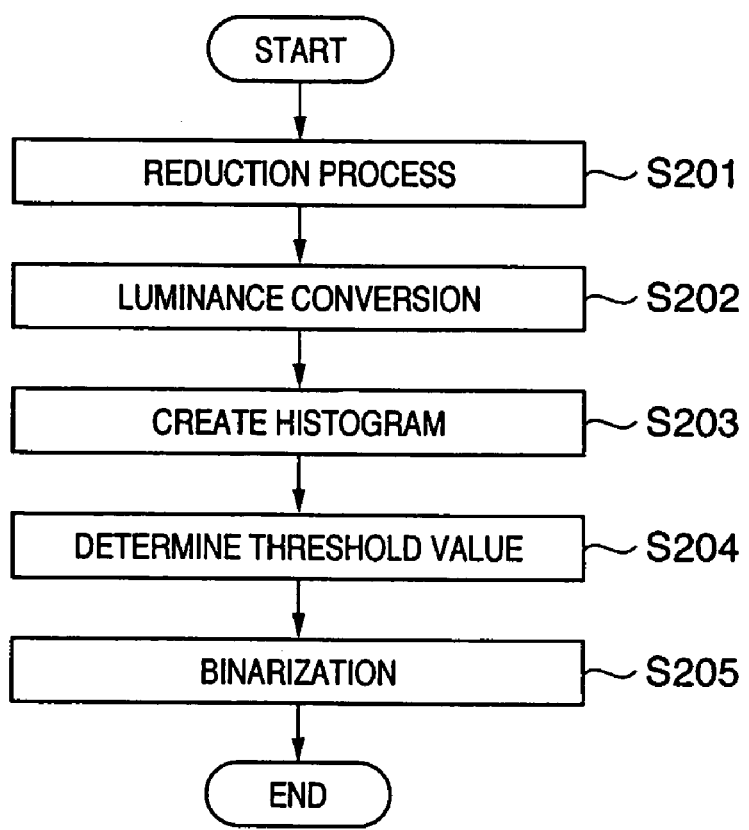
FIG. 3 is a flowchart showing a binarization process executed by a binary image generation unit according to the embodiment of the present invention.

FIG. 3 is a flowchart showing the binarization process executed by the binary image generation unit according to the embodiment of the present invention.

In step S201, a reduction process is executed for an input color image to generate a reduced color image. A purpose of this reduction process is to shorten the process time by reducing the size of the image to be processed. Another purpose is to generate a stable image by eliminating noise or fluctuation effect. In addition, since an image with a fixed resolution is generated by absorbing a variety of resolution differences of input data, a region segmentation process independent of the input resolution can be implemented.

For example, when a color image with a resolution of 300 dpi is input, a binary image with a resolution of 75 dpi is generated by a ¼ reduction process.

In step S202, the reduced color image is converted into a luminance image. Generally, the original image is a color image in the RGB format, and the luminance image is a gray scale image with a value of 0 to 255 per pixel. On the basis of the pixel value (R,G,B) of the original image, a luminance Y of each pixel is calculated by $$Y=0.299R+0.587G+0.114B$$

The color image may be converted into a luminance image by using any other format or conversion.

In step S203, the histogram of the luminance image is created. In step S204, a binarization threshold value is determined from the histogram. Two peaks, i.e., a character luminance and background luminance are detected from the histogram, and a value to separate them best is calculated as the threshold value. A detailed technique complies with a known method, and a description thereof will be omitted.

In step S205, a binarization process is executed for each pixel of the luminance image. More specifically, "1" is assigned to a black pixel having a pixel value smaller than the threshold value, and "0" is assigned to a white pixel having a pixel value equal to or larger than the threshold value, thereby generating a binary image.

Instead of executing first the reduction process for the color image and then the binarization process, the binarization process may be executed before the reduction process.

The region segmentation process executed by the region segmentation unit 103 will be described next with reference to FIG. 4.

Figure 4:
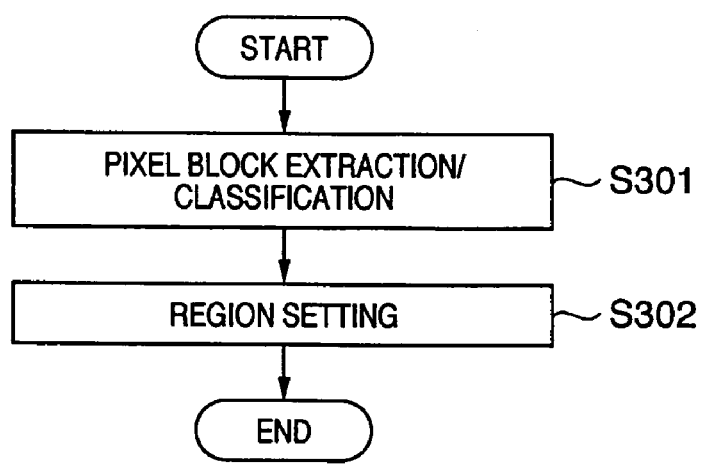
FIG. 4 is a flowchart showing a region segmentation process executed by a region segmentation unit according to the embodiment of the present invention.

FIG. 4 is a flowchart showing the region segmentation process executed by the region segmentation unit according to the embodiment of the present invention.

As shown in FIG. 4, the region segmentation process is roughly divided into two processes in steps S301 and S302. Details of the first process in step S301, i.e., a pixel block extraction/classification process will be described with reference to the flowchart in FIG. 5.

Figure 5:
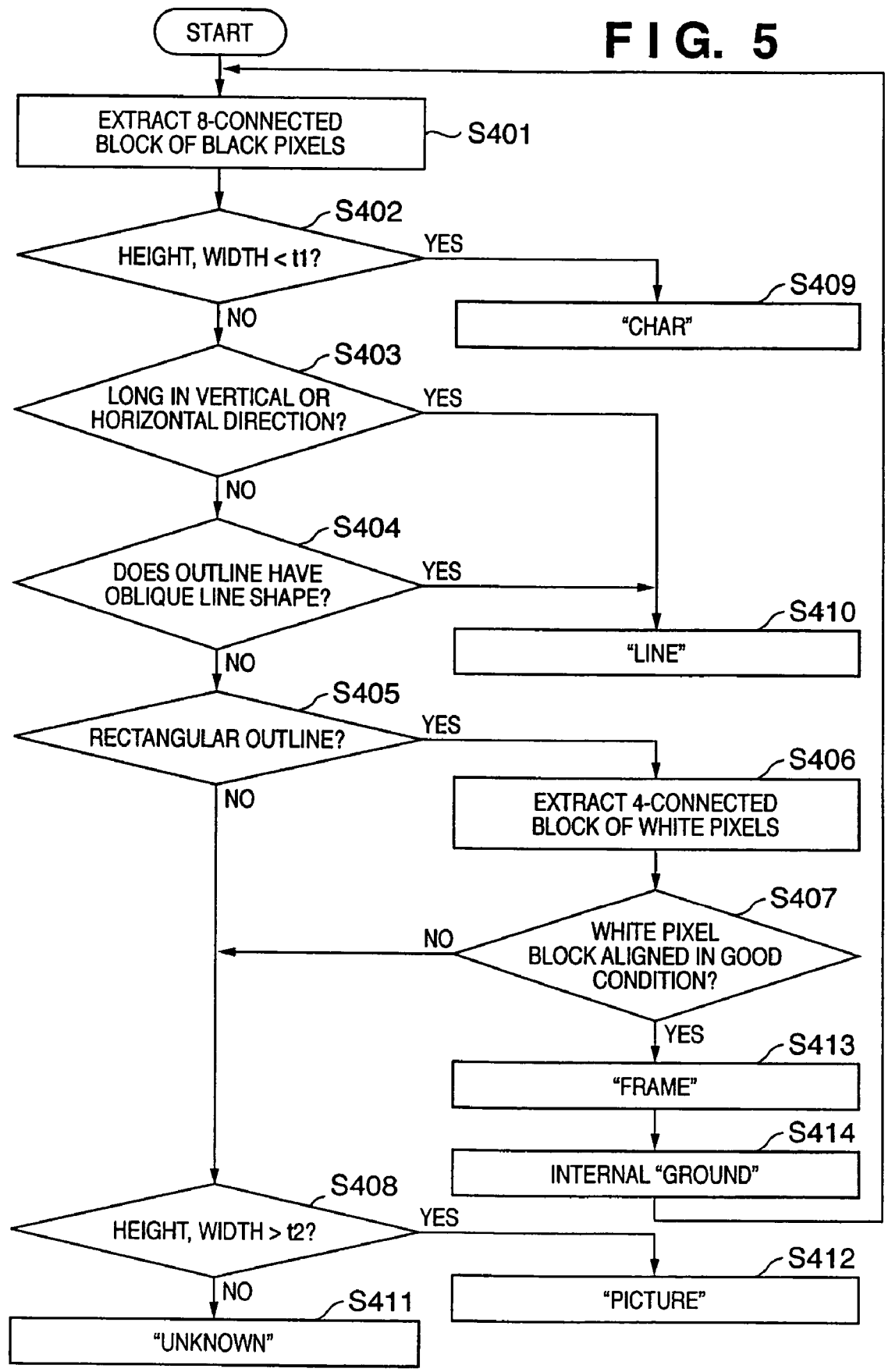
FIG. 5 is a flowchart showing details of a process in step S301 according to the embodiment of the present invention.

FIG. 5 is a flowchart showing details of the process in step S301 according to the embodiment of the present invention.

In step S401, all 8-connected outline blocks of black pixels are extracted from the monochrome image (binary image). An 8-connected outline block of black pixels indicates a set of black pixels which have an outline formed by pixels contacting in the vertical, horizontal, and diagonal directions, as shown in FIG. 6A. This set will be referred to as a black pixel block hereinafter. To extract a black pixel block, known outline tracing or labeling can be used, and a description thereof will be omitted. The process from step S402 is executed for each black pixel block extracted in step S401.

In step S402, a black pixel block as a process target is selected from all the extracted black pixel blocks. It is determined whether the height and width of the black pixel block selected as the process target are smaller than a predetermined threshold value t1 for predicted maximum character height and width. If the height and width are smaller than the predetermined threshold value t1 (YES in step S402), the flow advances to step S409 to determine the black pixel block as a character element and classify it into "CHAR". If the height and width are equal to or larger than the predetermined threshold value t1 (NO in step S402), the flow advances to step S403.

In step S403, it is determined whether the black pixel block as the process target is long in the vertical or horizontal direction at a predetermined ratio or more. If the black pixel block is long in the vertical or horizontal direction (YES in step S403), the flow advances to step S410 to determine the black pixel block as a line element and classify it into "LINE". If the black pixel block is not long in the vertical or horizontal direction (NO in step S403), the flow advances to step S404.

In step S404, attention is focused on the outline formed by the black pixels in the black pixel block as the process target. It is determined whether the outline has an oblique thin line shape. If the outline has an oblique line shape (YES in step S404), the black pixel block is determined as a line element and classified into "LINE". If the outline has no oblique line shape (NO in step S404), the flow advances to step S405.

In step S405, it is determined whether the outline of the black pixel block as the process target is rectangular. If the outline is rectangular (YES in step S405), the flow advances to step S406. If the outline is not rectangular (NO in step S405), the flow advances to step S408.

Figure 7A:
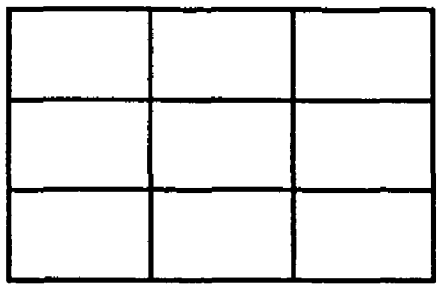
FIG. 7A is a view showing an example of a rectangular black pixel block according to the embodiment of the present invention.
Figure 7B:
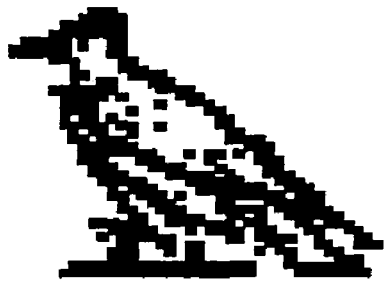
FIG. 7B is a view showing an example of a nonrectangular pixel block according to the embodiment of the present invention.

FIGS. 7A and 7B respectively show an example of a rectangular black pixel block and an example of a black pixel block with another shape (nonrectangular black pixel block).

In step S406, 4-connected outline blocks of white pixels which exist in the black pixel block as the process target are extracted. A 4-connected outline block of white pixels indicates a set of white pixels which have an outline formed by pixels contacting in only the vertical and horizontal directions, as shown in FIG. 6B. This set will be referred to as a white pixel block hereinafter.

In step S407, it is determined whether all the white pixel blocks extracted from the black pixel block as he process target are rectangular and densely fill the inside of the black pixel block. That is, it is determined whether the white pixel blocks are aligned in good condition. If the white pixel blocks are not aligned in good condition (NO in step S407), the flow advances to step S408. If the white pixel blocks are aligned in good condition (YES in step S407), the flow advances to step S413 to determine the black pixel block as a frame element and classify it into "FRAME". In step S414, the inside of the frame element is determined as a ground element (internal white pixel block element) and classified into "GROUND".

Figure 8A:
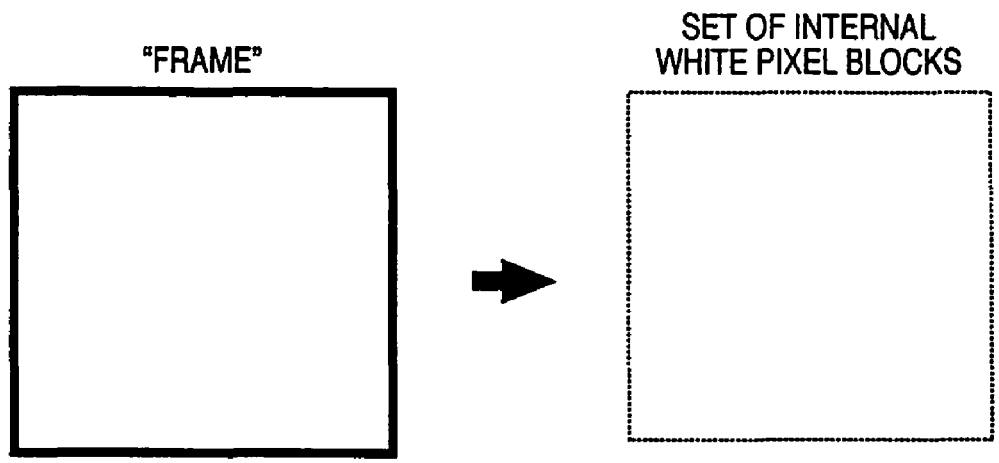
FIG. 8A is a view showing an example of the aligned state of an internal white pixel block according to the embodiment of the present invention.
Figure 8B:
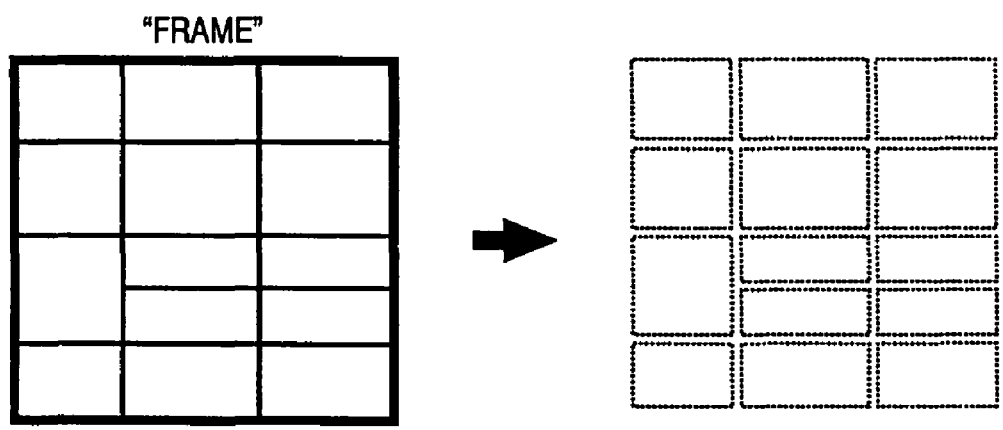
FIG. 8B is a view showing an example of the aligned state of an internal white pixel block according to the embodiment of the present invention.
Figure 8C:
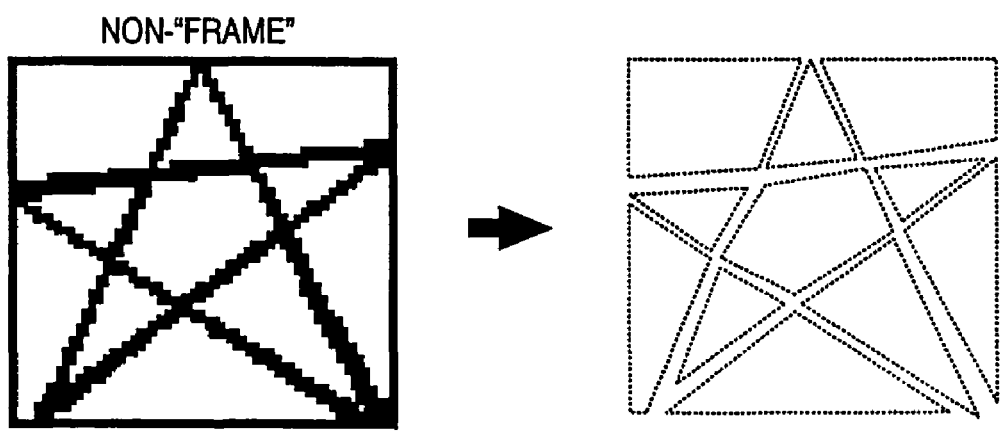
FIG. 8C is a view showing an example of the aligned state of an internal white pixel block according to the embodiment of the present invention.

FIGS. 8A and 8B show examples of "FRAME" and a set of internal white pixel blocks. FIG. 8C shows another example.

For a black pixel block as a process target that satisfies no conditions until step S407, it is determined in step S408 whether the width or height is equal to or larger than a predetermined threshold value t2. If the height or width is equal to or larger than the predetermined threshold value t2 (YES in step S408), the black pixel block is determined as a picture element and classified into "PICTURE". If the height or width is smaller than the predetermined threshold value t2 (NO in step S408), the black pixel block is determined as an unknown element and classified into "UNKNOWN". The "UNKNOWN" black pixel block is still indistinguishable at this point and may be a relatively large character, a graphic other than a character, or a part of a graphic or photo.

The classification process in steps S401 to S412 is executed for all black pixel blocks in the binary image. Then, attention is focused on the white pixel blocks extracted from the "FRAME" black pixel block. Black pixel blocks are extracted from each white pixel block and subjected to the process in steps S401 to S412. When "FRAME" is extracted from these black pixel blocks, a search process (recursive internal search process) of elements in the black pixel block is recursively executed.

Figure 9:
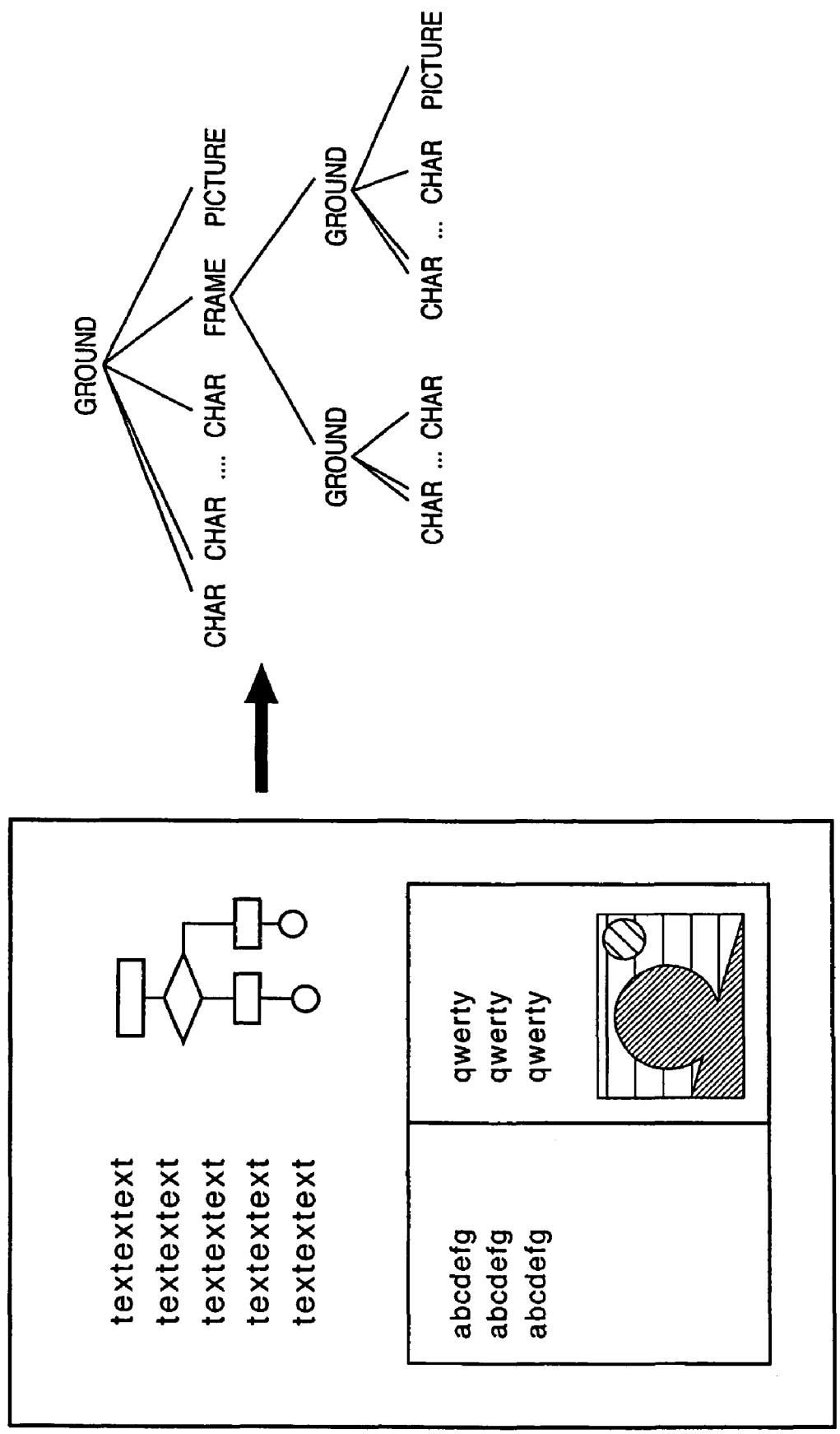
FIG. 9 is a view showing an example of the tree structure of a black pixel block according to the embodiment of the present invention.

The white pixel blocks used in the recursive internal search process and the entire input image are defined as one white pixel block for the descriptive convenience. The set of the classified black pixel blocks and white pixel blocks has a tree structure. FIG. 9 shows an example of the tree structure of the elements extracted in step S301. A category name "GROUND" is given to a white pixel block here.

Details of the latter half of the region segmentation process in step S302, i.e., the region setting process will be described next with reference to FIG. 10.

Figure 10:
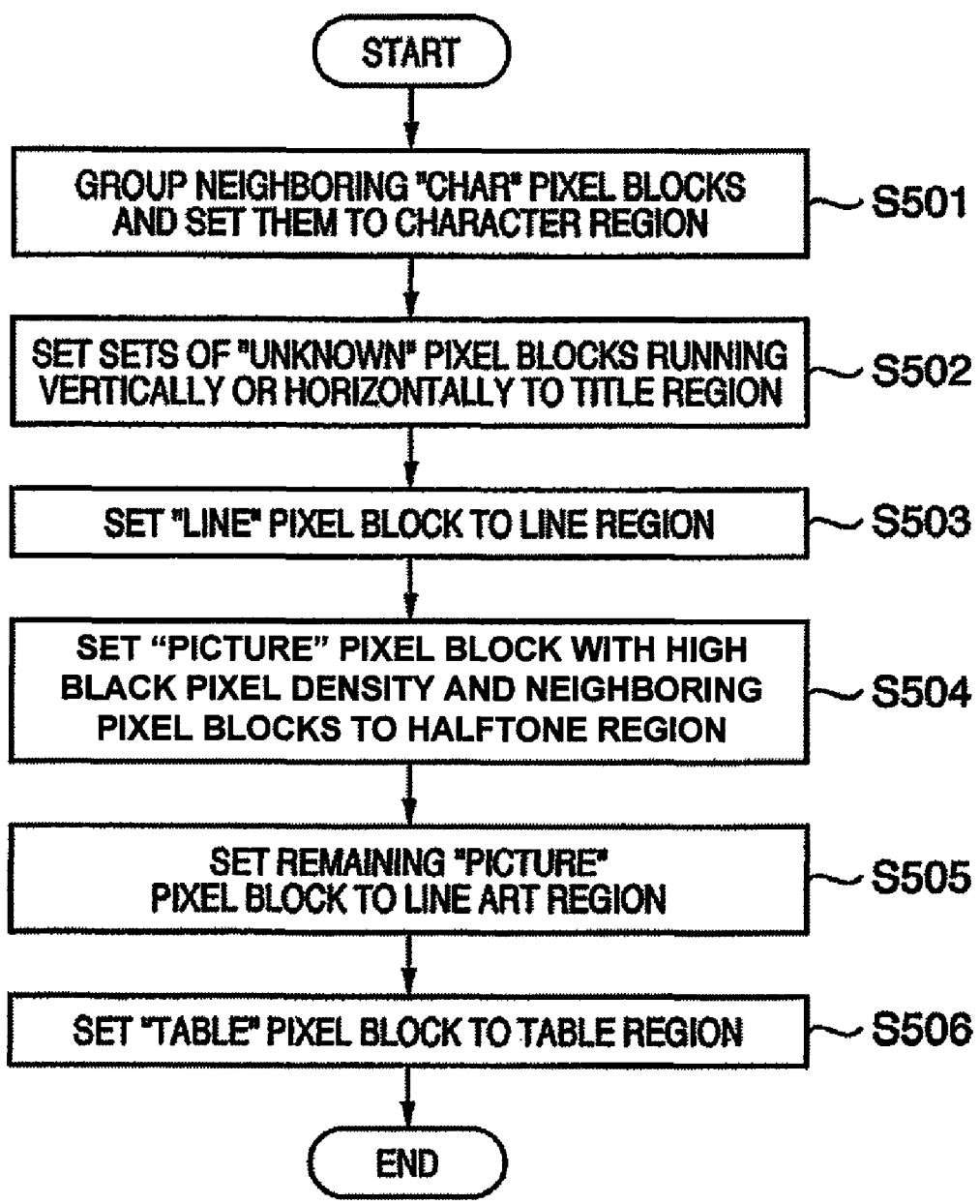
FIG. 10 is a flowchart showing details of a process in step S302 according to the embodiment of the present invention.

FIG. 10 is a flowchart showing details of the process in step S302 according to the embodiment of the present invention.

In step S501, attention is focused on "CHAR" pixel blocks. "CHAR" pixel blocks within a predetermined distance in the vertical or horizontal direction are grouped. A rectangle around each group is set to a character region (TEXT). It is checked whether the character string in each character region is laid out in the horizontal or vertical direction. For example, horizontal distances from each pixel block in the region to the nearest pixel blocks on the left and right sides and vertical distances from each pixel block to the nearest pixel blocks on the upper and lower sides are calculated. The direction in which the average value of the distances is smaller is determined as the direction of the character string.

In step S502, sets which have almost the same size and run in a line vertically or horizontally are detected from "UNKNOWN" pixel blocks. These sets are grouped and set to a title region (TITLE).

In step S503, a rectangle around each "LINE" region is set to a line region (LINE).

In step S504, of "PICTURE" pixel blocks, a pixel block having a predetermined size or more and a high ratio of black and white pixels inside the outline, i.e., a high black pixel density is set to a halftone region (HALFTONE) such as a photo or picture. If "CHAR", "UNKNOWN", and "LINE" pixel blocks are included in the halftone region or exist in the vicinity of it, the pixel blocks are integrated, and a halftone region to surround all of them is formed. If an integrated black pixel block already belongs to another region, that region is reconstructed except the pixel block.

In step S505, each of the "PICTURE" pixel blocks remaining in step S504 is set to a line art region (LINEART).

In step S506, each "FRAME" pixel block is set to a table region (TABLE).

The process in steps S501 to S506 is executed for all black pixel blocks in the input image. Grouping in step S501, S502, or S504 is executed for only black pixel blocks that exist in one "GROUND" pixel block.

With the process in step S302, regions classified into a plurality of types are obtained from the binary image. When a GROUND region is set as a region corresponding to a "GROUND" pixel block in FIG. 9, all regions having an inclusion relation can be expressed by a tree structure.

Figure 11:
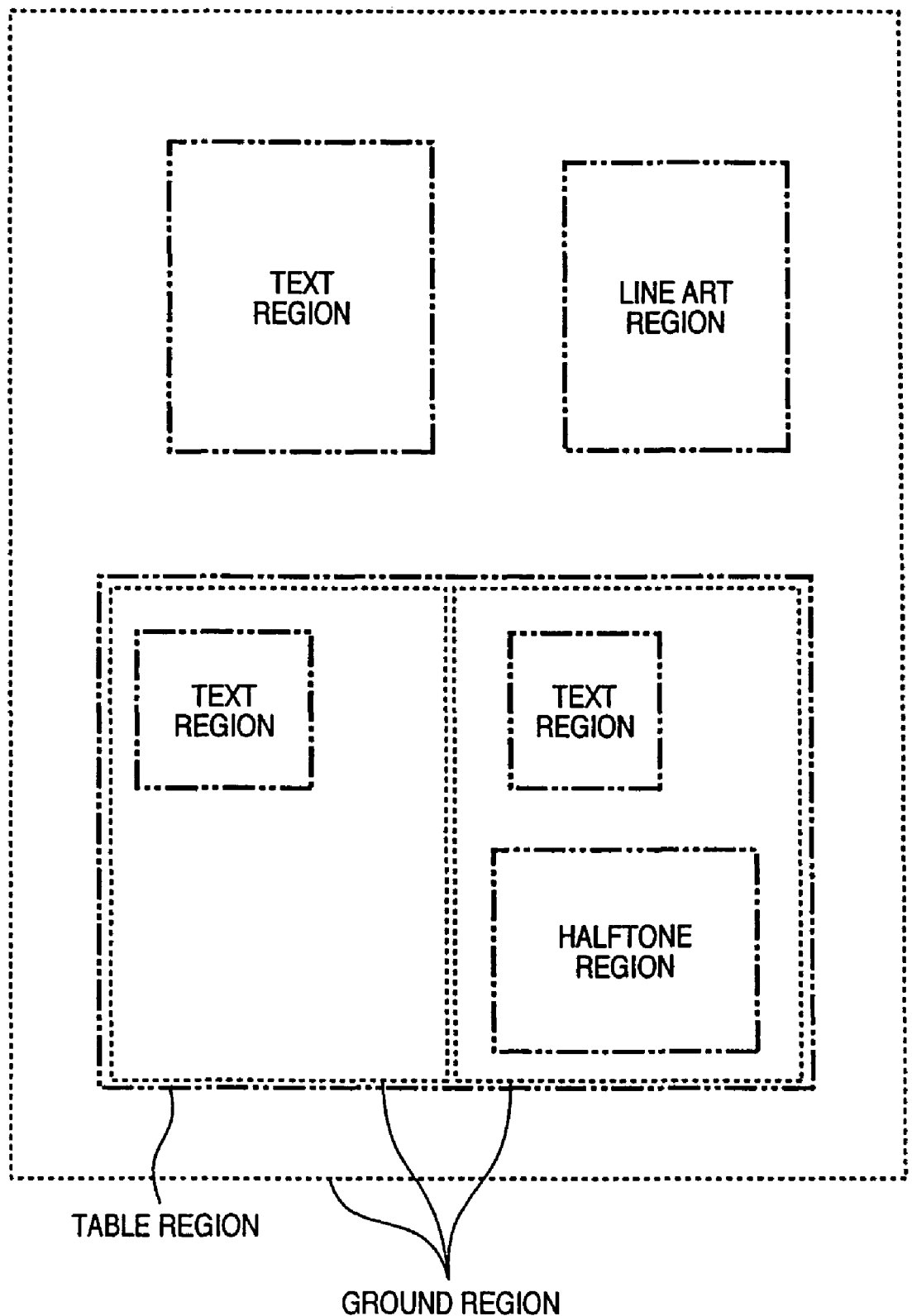
FIG. 11 is a view showing an example of a region segmentation result according to the embodiment of the present invention.
Figure 12:
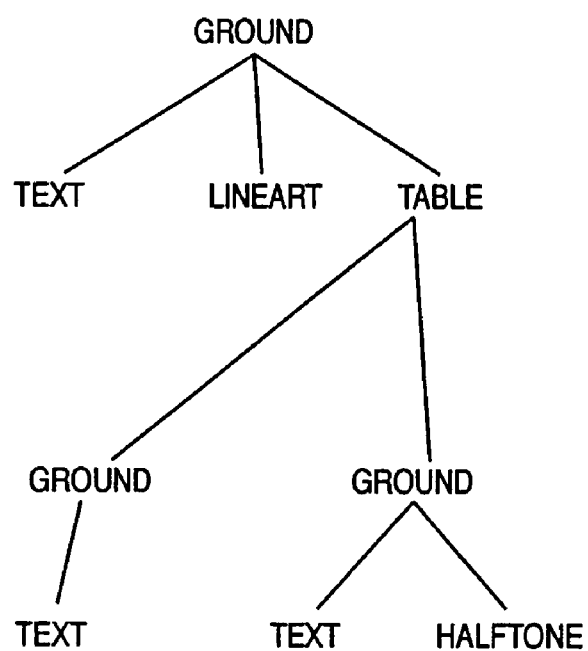
FIG. 12 is a view showing an example of the tree structure of a region according to the embodiment of the present invention.

As the process result of the region segmentation unit 103, the tree structure by regions and region segmentation information containing the types of the regions and circumscribed rectangles are obtained. The region segmentation information is stored in, e.g., a memory. FIG. 11 shows an example of a region segmentation process result corresponding to the input image shown in FIG. 9. FIG. 12 shows an example of the tree structure.

The edge image generation process executed by the edge image generation unit 104 will be described next with reference to FIG. 13.

Figure 13:
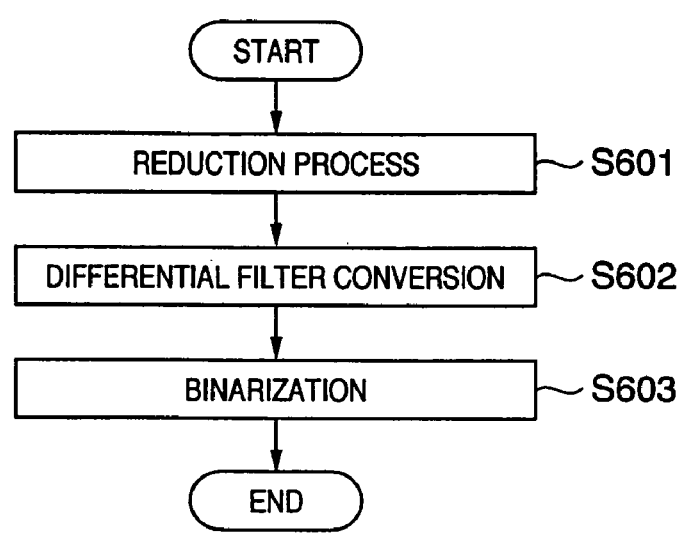
FIG. 13 is a flowchart showing an edge image generation process executed by an edge image generation unit according to the embodiment of the present invention.

FIG. 13 is a flowchart showing the edge image generation process executed by the edge image generation unit according to the embodiment of the present invention.

In step S601, a reduction process is executed for the color image. This reduction process is executed for the same reason as in the binary image generation process. The scale is also the same as in the binary image generation process.

Figure 14:
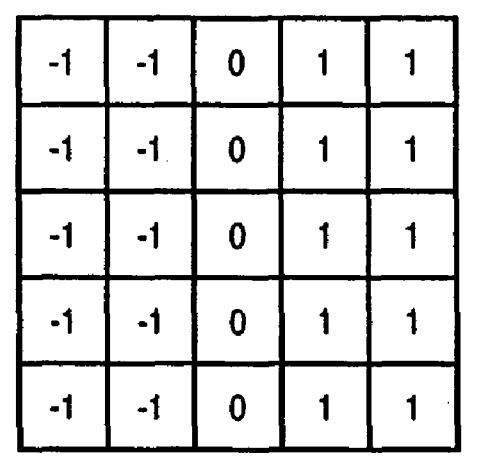

In step S602, an image (edge-enhanced image) representing the edge strength in each pixel is obtained by using a differential filter (differential filter conversion). A generally known method is used, and a detailed description thereof will be omitted. For example, differential calculation in four directions is executed for each pixel while rotating a 5×5 primary differential filter shown in FIG. 14 every 90°. Alternatively, the edge-enhanced image may be obtained by passing the R, G, and B pixel values of the color image before luminance conversion through the differential filter and ORing the results.

In step S603, a binary edge image is created by quantizing the edge strength to "1" and "0" on the basis of the edge-enhanced image. This image will be simply referred to as an edge image hereinafter.

The character remove process executed by the character part remove unit 105 will be described next.

The character part remove unit 105 sets pixels of a part corresponding to a character region in the image to a pixel value (e.g., 0) of lowest level on the edge image in accordance with the region segmentation information obtained by the region segmentation unit 103. More specifically, a black pixel block set belonging to a range determined as a character region is represented by {Bi} (i=1, ..., n). Pixels on the edge image in the range of a circumscribed rectangle (xi1,yi1)-(xi2,yi2) around each Bi are changed to 0. That is, a region determined as a character region by the region segmentation unit is removed from the edge image.

The outline extraction process executed by the outline extraction unit 106 will be described next with reference to FIG. 15.

Figure 15:
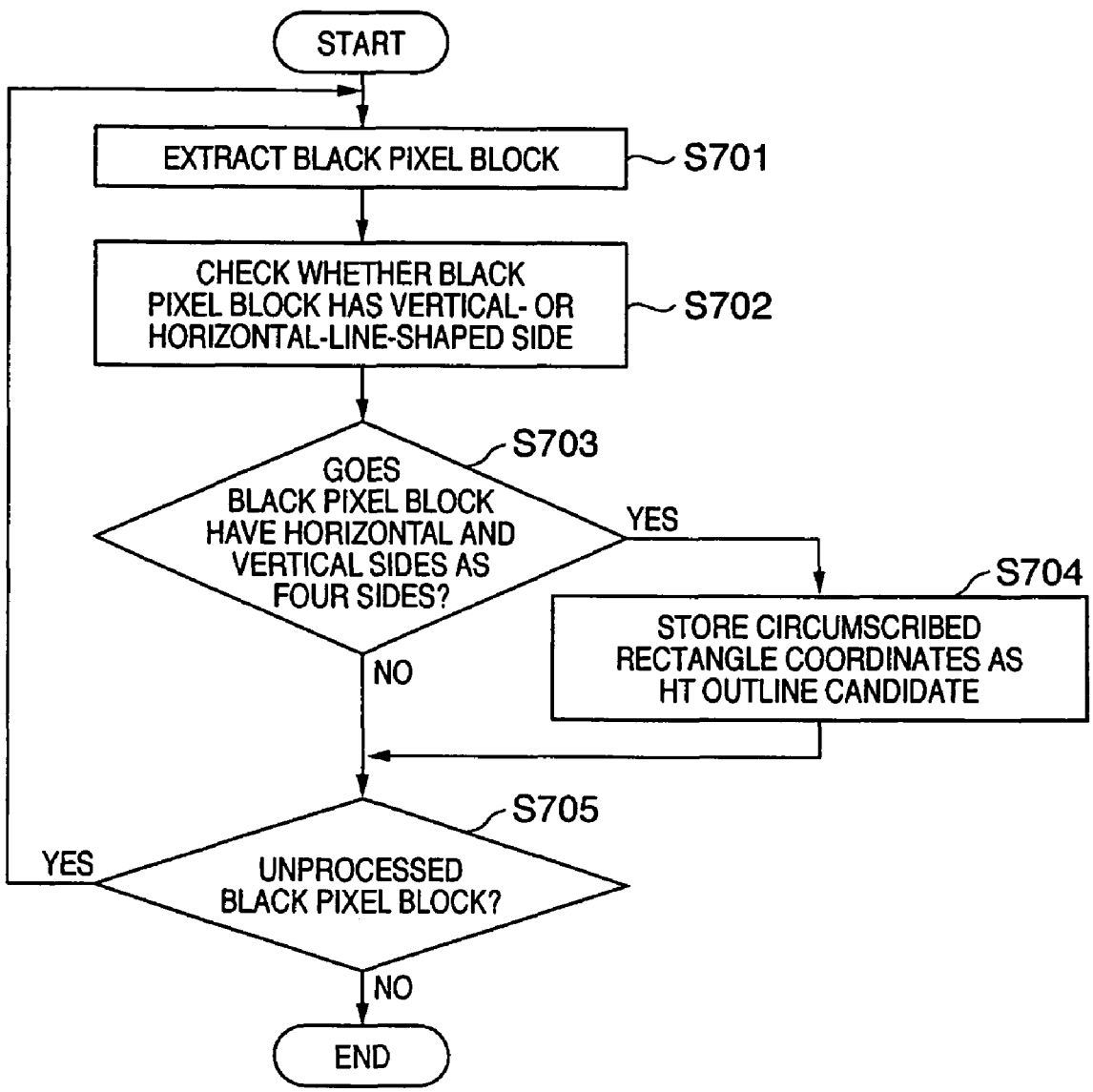
FIG. 15 is a flowchart showing details of an outline extraction process executed by an outline extraction unit according to the embodiment of the present invention.

FIG. 15 is a flowchart showing details of the outline extraction process executed by the outline extraction unit according to the embodiment of the present invention.

In step S701, a black pixel block is extracted from the edge image whose character regions are removed by the character part remove unit. The black pixel block is extracted in the same way as in step S401 in FIG. 5. The process from step S702 is executed for the extracted black pixel block.

In step S702, the shape of the extracted black pixel block is checked. More specifically, it is checked whether the black pixel block has a vertical-line-shaped side or horizontal-line-shaped side. That a vertical-line-shaped side exists indicates a state wherein black pixels stand on a single vertical line at a predetermined ratio or more at the left or right end of the black pixel block, and the length of the line is equal to or larger than a threshold value. That a horizontal-line-shaped side exists indicates a state wherein black pixels stand on a horizontal line in a predetermined length or more at the upper or lower end of the black pixel block.

In step S703, it is determined whether the vertical- and horizontal-line-shaped sides extracted in step S702 correspond to all four sides of the black pixel block, i.e., the black pixel block forms a clear rectangular outline. If the black pixel block forms a clear rectangular outline (YES in step S703), the flow advances to step S704. The black pixel block is regarded as a halftone outline candidate (to be referred to as an HT outline candidate hereinafter), and the circumscribed rectangular coordinates are stored in the memory. If the black pixel block forms no clear rectangular outline (NO in step S703), the black pixel block is not determined as a halftone outline candidate, and the flow advances to step S705 without any process.

In step S705, it is determined whether an unprocessed black pixel block remains in the edge image. If an unprocessed black pixel block exists (YES in step S705), the flow returns to step S701 to execute the process for the next black pixel block. If no unprocessed black pixel block remains, i.e., if the process is executed for all black pixel blocks (NO in step S705), the process is ended.

The composition process executed by the composition unit 107 will be described next with reference to FIG. 16.

Figure 16:
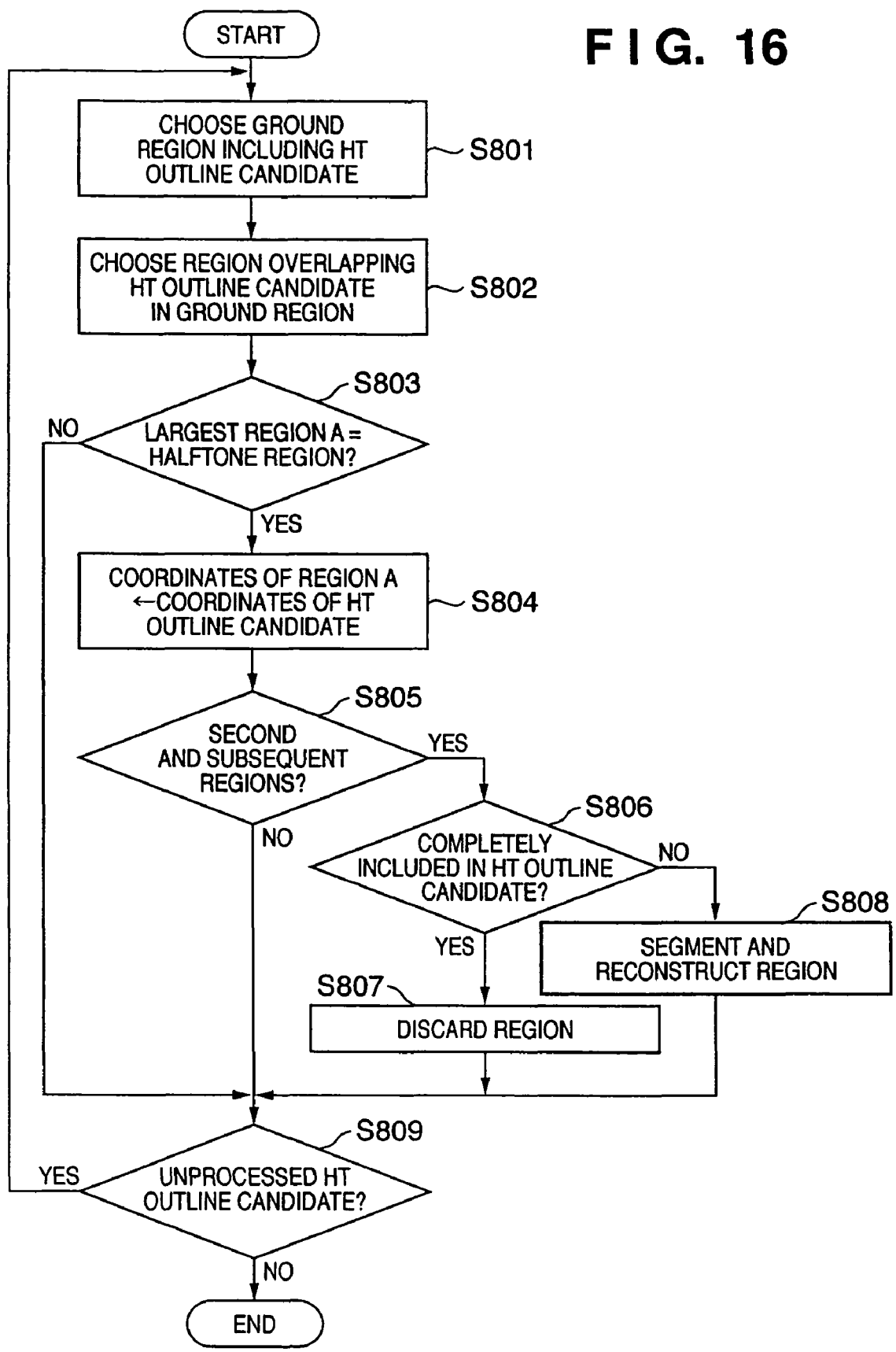
FIG. 16 is a flowchart showing a composition process executed by a composition unit according to the embodiment of the present invention.

FIG. 16 is a flowchart showing the composition process executed by the composition unit according to the embodiment of the present invention.

In step S801, for the HT outline candidate extracted by the outline extraction unit 106, a GROUND region which includes the HT outline candidate and is present at the deepest position in the tree structure is chosen from the region segmentation information obtained by the region segmentation process.

In step S802, all regions overlapping the circumscribed rectangle of the HT outline candidate are chosen from regions inside the GROUND region chosen in step S801.

In step S803, it is determined whether the type of a region A having the largest area in the regions chosen in step S802 is a halftone region. If the type of the region A is a halftone region (YES in step S803), the flow advances to step S804. If the type of the region A is not a halftone region (NO in step S803), the flow advances to step S809 without executing any process for the HT outline candidate.

In step S804, the coordinate information of the region A in the region segmentation information is substituted with the circumscribed rectangle coordinates of the HT outline candidate.

In step S805, it is determined whether two or more regions are extracted in step S802. If only one region is present (NO in step S805), the flow advances to step S809. If there are two or more regions (YES in step S805), the flow advances to step S806.

In step S806, the relationship between the HT outline candidate and each of the remaining regions is checked to determine whether the region is completely included in the HT outline candidate. If the region is completely included (YES in step S806), the flow advances to step S807 to discard the information of the region from the region segmentation information.

If the region is not completely included (NO in step S806), i.e., if the region is partially included in the HT outline candidate, the flow advances to step S808 to reconstruct the region by using only black pixel blocks that are not included in the HT outline candidate. If the pixel block is located across the outline of the HT outline candidate, the pixel block is segmented at an HT outline end, and the region is reconstructed by using only pixel block outside the HT outline candidate.

In step S809, it is determined whether an unprocessed HT outline candidate remains. If an unprocessed HT outline candidate remains (YES in step S809), the flow returns to step S801 to execute the process for the next HT outline candidate. If no unprocessed HT outline candidate remains (NO in step S809), the process is ended.

An example wherein a color image shown in FIG. 17 is processed in accordance with this embodiment will be described next.

Figure 19:
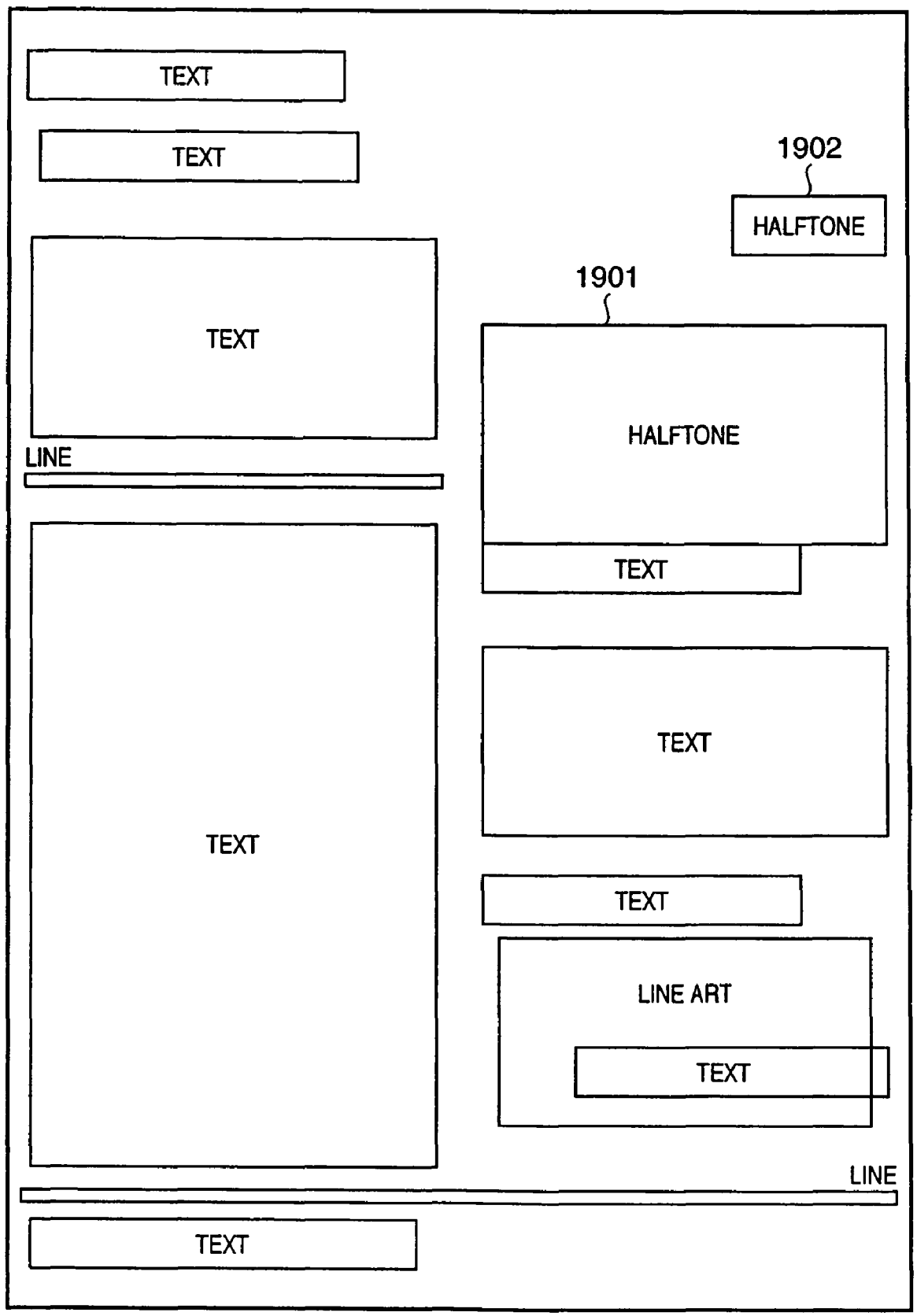
FIG. 19 is a view showing an example of a region segmentation result of a binary image according to the embodiment of the present invention.

When the color image is input from the input unit 101, the binary image generation unit 102 generates a binary image shown in FIG. 18. When the process of the region segmentation unit 103 is executed for the binary image, a region segmentation result shown in FIG. 19 is obtained.

Attention is focused on a photo image 1701 in FIG. 17. A light-color portion is lost upon binarization (the upper half part of the photo is changed to white pixels by binarization, as shown in FIG. 18). Hence, in the region segmentation result in FIG. 19, no correct halftone region corresponding to the photo image 1701 can be obtained, and halftone regions 1901 and 1902 are generated.

When the process of the edge image generation unit 104 is executed for the color image, a binary edge image shown in FIG. 20 is obtained. Attention is focused on a photo image 2001 in the binary edge image. Even the light-color outline portion on the upper side is obtained clearly. However, the region contacts the text immediately under it because of errors of the reduction process or edge extraction filter. If the process of the outline extraction unit 106 is executed in this state, the horizontal line of the lower side cannot be extracted accurately. Hence, the region is not extracted as an HT outline candidate.

To prevent this, in this embodiment, the character part remove unit 105 removes pixels corresponding to character regions obtained by the region segmentation unit 103 from the binary edge image, thereby generating a binary edge image after character region removal shown in FIG. 21. The process of the outline extraction unit 106 is executed for the binary edge image shown in FIG. 21. For this reason, a halftone region such as a photo image 2101 can be extracted as a correct rectangular HT outline candidate. In addition, since the number of black pixel blocks to be processed in outline extraction decreases, the process of the outline extraction unit 106 itself can be executed at a higher speed.

Figure 22:
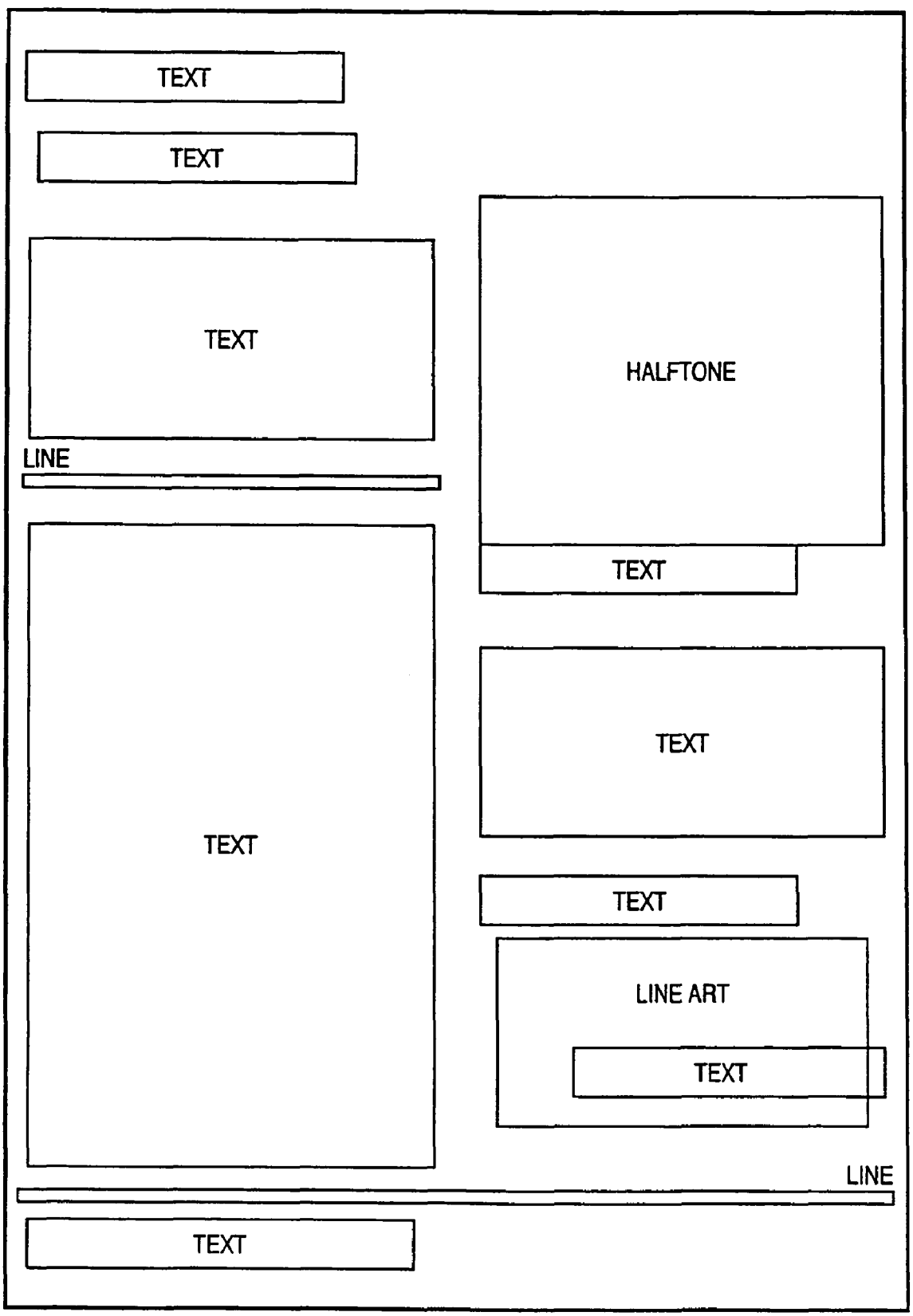
FIG. 22 is a view showing an example of a final region segmentation result according to the embodiment of the present invention.

The composition unit 107 corrects (overwrites and composites) the coordinate information of the halftone region 1901 in FIG. 19 on the basis of the HT outline candidate of the photo image 2101 and simultaneously discards the halftone region 1902. As a result, region segmentation information capable of segmenting a correct halftone region from the process target image can be obtained, as shown in FIG. 22.

That is, for the region where the region segmentation information and outline extraction information overlap, the composition unit 107 uses the region represented by the outline extraction information as a halftone region, thereby correcting the region segmentation information.

As described above, according to this embodiment, the region segmentation process is executed for an original multilevel image containing both character regions and photo/natural picture image regions after binarization. In addition, the outline of a halftone region is extracted from an edge image obtained by using a differential filter for the original image, and the region segmentation process result is corrected.

Especially, the outline of the halftone region is extracted after pixels corresponding to character regions obtained by the region segmentation process are removed from the edge image. This extraction result is composited to the region segmentation process result. Hence, the region segmentation process can be executed more accurately without any interference of outline extraction by character contact caused by the influence of reduction or the differential filter. Furthermore, the process can be speeded up by omitting any wasteful outline extraction process.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

This application claims the benefit of Japanese Application No. 2005-025507, filed Feb. 1, 2005, 2005-362374, filed Dec. 15, 2005, which are hereby incorporated by reference herein in their entirety.

What is claimed is:

1. An image processing apparatus for segmenting a multilevel image into a plurality of regions with different attributes, comprising:

an input processor for inputting a multilevel image;

a binary image generation processor for generating a binary image by binarizing the multilevel image;

a region segmentation processor for segmenting the binary image into a plurality of regions with different attributes to obtain a first region segmentation result, the plurality of regions including a character region classified as a character attribute and a halftone region classified as a halftone attribute;

an edge image generation processor for generating a binary edge image by obtaining an edge strength of each pixel based on the multilevel image and binarizing each pixel based on the obtained edge strength, the binary edge image including first and second pixel values, the first pixel value representing an edge component, and the second pixel value representing a non-edge component;

an outline extraction processor for extracting a pixel block having the first pixel value from the binary edge image, determining whether the pixel block forms a rectangular outline of which each length of four sides is equal to or larger than a threshold value, and (1) if the pixel block forms the rectangular outline, storing the pixel block as an outline candidate of a halftone region, and (2) if the pixel block does not form the rectangular outline, not storing the pixel block as an outline candidate;

a composition processor for obtaining a second region segmentation result by correcting the halftone region of the first region segmentation result obtained by the region segmentation processor with the outline candidate stored by the outline extraction processor when the halftone region of the first region segmentation result overlaps with the outline candidate stored by the outline extraction processor; and an output processor for outputting the second region segmentation result obtained by the composition processor.

2. The apparatus according to claim 1, further comprising a remove processor for removing the character region of the binary edge image by setting, on the binary edge image, pixels included in the character region classified by the region segmentation processor to the second pixel value, wherein the outline extraction processor extracts the outline candidate of the halftone region from the binary edge image in which the character region is removed by the remove processor.

3. The apparatus according to claim 1, wherein each of the binary image generation processor and the edge image generation processor includes a reduction process processor for executing a reduction process for each image as a process target.

4. The apparatus according to claim 1, wherein the edge image generation processor includes:

a reduction process processor for executing a reduction process for the multilevel image to generate a reduced image; and a generation processor for generating the binary edge image by obtaining an edge strength in each pixel of the reduced image and binarizing each pixel based on the obtained edge strength.

5. A control method for operating an image processing apparatus for segmenting a multilevel image into a plurality of regions with different attributes, comprising steps of:

inputting a multilevel image to an image processing apparatus;

generating, by the image processing apparatus, a binary image by binarizing the multilevel image;

segmenting, by the image processing apparatus, the binary image into a plurality of regions with different attributes to obtain a first region segmentation result, the plurality of regions including a character region classified as a character attribute and a halftone region classified as a halftone attribute;

generating, by the image processing apparatus, a binary edge image by obtaining an edge strength of each pixel based on the multilevel image and binarizing each pixel based on the obtained edge strength, the binary edge image including first and second pixel values, the first pixel value representing an edge component, and the second pixel value representing a non-edge component;

extracting, by the image processing apparatus, a pixel block having the first pixel value from the binary edge image, determining whether the pixel block forms a rectangular outline of which each length of four sides is equal to or larger than a threshold value, and (1) if the pixel block forms the rectangular outline, storing the pixel block as an outline candidate of a halftone region, and (2) if the pixel block does not form the rectangular outline, not storing the pixel block as an outline candidate;

producing a second region segmentation result by correcting the halftone region of the first region segmentation result obtained in the segmenting step with the outline candidate obtained in the extracting step when the halftone region of the first region segmentation result overlaps with the outline candidate stored by the outline extraction unit; and outputting the second region segmentation result.

6. A program stored in a non-transitory computer-readable memory to implement control of an image processing apparatus for segmenting a multilevel image into a plurality of regions with different attributes, comprising:

a program code for inputting a multilevel image;

a program code for generating a binary image by binarizing the multilevel image;

a program code for segmenting the binary image into a plurality of regions with different attributes to obtain a first region, the plurality of regions including a character region classified as a character attribute and a halftone region classified as a halftone attribute;

a program code for generating a binary edge image by obtaining an edge strength of each pixel based on the multilevel image and binarizing each pixel based on the obtained edge strength, the binary edge image including first and second pixel values, the first pixel value representing an edge component, and the second pixel value representing a non-edge component;

a program code for extracting a pixel block having the first pixel value from the binary edge image, determining whether the pixel block forms a rectangular outline of which each length of four sides is equal to or larger than a threshold value, and (1) if the pixel block forms the rectangular outline, storing the pixel block as an outline candidate of a halftone region, and (2) if the pixel block does not form the rectangular outline, not storing the pixel block as an outline candidate;

a program code for producing a second region segmentation result by correcting the halftone region of the first region segmentation result with the outline candidate when the halftone region of the first region segmentation result overlaps with the outline candidate stored by the outline extraction unit; and a program code for outputting the second region segmentation result.

* * * * *